(12) United States Patent  
Costa et al.

(10) Patent No.: US 7,296,655 B2
(45) Date of Patent: Nov. 20, 2007

(54) DUCT LINER ACOUSTIC SPLICE

(75) Inventors: Mark W. Costa, Storrs, CT (US); Charles W. Brown, East Hampton, CT (US); Chris Freiler, Bristol, CT (US)

(73) Assignee: United Technologies Corporation, Hartford, CT (US)

( * ) Notice: Subject to any disclaimer, the term of this patent is extended or adjusted under 35 U.S.C. 154(b) by 357 days.

(21) Appl. No.: 11/112,642

(22) Filed: Apr. 22, 2005

(65) Prior Publication Data

US 2006/0237260 A1   Oct. 26, 2006

(51) Int. Cl.
- B64C 1/40 (2006.01)
- B64C 1/12 (2006.01)
- B64C 1/06 (2006.01)
- B64D 33/02 (2006.01)
- F02K 1/82 (2006.01)

(52) U.S. Cl. .................. 181/210; 181/214; 244/1 N; 244/131; 244/132

(58) Field of Classification Search ............ 181/210, 181/214, 213, 292; 244/1 N, 53 B, 131, 244/132
See application file for complete search history.

(56) References Cited

U.S. PATENT DOCUMENTS

| 3,821,999 | A | * | 7/1974 | Guess et al. ............ 181/296 |
| 4,161,231 | A | * | 7/1979 | Wilkinson ............... 181/292 |
| 4,293,053 | A | * | 10/1981 | Shuttleworth et al. ...... 181/213 |
| 5,000,399 | A | * | 3/1991 | Readnour et al. ......... 244/53 B |
| 5,297,760 | A | * | 3/1994 | Hart-Smith ............. 244/132 |
| 5,581,054 | A | * | 12/1996 | Anderson et al. .......... 181/213 |
| 6,328,261 | B1 | * | 12/2001 | Wollaston et al. ......... 181/210 |
| 6,761,245 | B2 | * | 7/2004 | Porte .................... 181/210 |
| 6,772,857 | B2 | * | 8/2004 | Porte et al. .............. 181/210 |
| 6,820,337 | B2 | * | 11/2004 | Buge et al. ............. 29/897.32 |
| 6,892,526 | B2 | * | 5/2005 | Stretton et al. ........... 60/226.1 |
| 6,923,931 | B2 | * | 8/2005 | Dublineau et al. ......... 264/414 |
| 2002/0078569 | A1 | * | 6/2002 | Buge et al. ............. 156/308.4 |
| 2004/0045766 | A1 | | 3/2004 | Porte et al. |
| 2005/0081992 | A1 | | 4/2005 | Buge et al. |

FOREIGN PATENT DOCUMENTS

| EP | 0 572 725 | 12/1993 |
| EP | 1 167 185 | 1/2002 |
| EP | 1 591 643 | 11/2005 |
| EP | 1 621 752 | 2/2006 |
| EP | 1 715 172 | 10/2006 |

OTHER PUBLICATIONS

Extended European Search Report dated Dec. 29, 2006.

* cited by examiner

*Primary Examiner*—Edgardo San Martin
(74) *Attorney, Agent, or Firm*—Carlson, Gaskey & Olds

(57) ABSTRACT

A duct liner assembly includes a noise attenuation layer for absorbing noise energy that is covered by a face sheet. The face sheet includes a seam that is covered by an acoustically active splice. The acoustically active splice includes a plurality of acoustic regions that provide for communication of noise energy to the noise attenuation layer to minimize creation of acoustically dead areas.

18 Claims, 3 Drawing Sheets

DUCT LINER ACOUSTIC SPLICE

BACKGROUND OF THE INVENTION

This application generally relates to an acoustic liner for a duct. More particularly, this application relates to a splice for covering seams in the acoustic liner.

Conventional turbine and turbofan engines for aircraft include a plurality of fan blades that rotate within a duct commonly known as a fan case. The fan case serves as a protective covering to protect the fan blades and the aircraft. Further the fan case channels airflow into the turbine engine. The inner surface of the fan case is constructed to withstand impacts from objects that may come into contact with the fan case and includes acoustical features to reduce the noise emitted from the engine.

It is known to provide a fan case liner with a layer of noise attenuation structures and a face layer including a plurality of openings. The face layer is typically a thin sheet of metal or composite material mounted over the noise attenuation structure. Noise causing pressure disturbances emanate through openings within the face layer into the noise attenuation structure where the pressure disturbances dissipate to reduce the total amount of noise.

The face layer forms the inner surface and typically includes at least one seam to accommodate assembly tolerances as well as accommodating loads generated by thermal expansion. A splice is bonded over the seam to protect the edges of the face sheet and the underlying noise attenuation structure. The splice is typically a solid strip of material that overlaps each side of the face layer. The splice is bonded with an adhesive to the face layer on either side of the seam. The adhesive and splice combine to block openings through the face layer to the noise attenuation structure. Disadvantageously, this results in an acoustically dead area within the liner assembly that does not absorb noise. The acoustically dead area reduces the effectiveness of the noise attenuation structures of the acoustic liner.

Accordingly, it is desirable to develop a splice for an acoustic liner that is acoustically active to improve noise attenuation properties of a liner assembly.

SUMMARY OF THE INVENTION

An example fan case assembly according to this invention includes a liner assembly having a face sheet with a plurality of openings. A seam within the face sheet is covered over with an acoustically active splice that includes a plurality of acoustic regions that provide for communication of noise energy through the acoustic splice to the noise attenuation layer.

The fan case assembly includes a housing and a liner assembly. The liner assembly includes the noise attenuation layer that is covered by the protective face sheet. The face sheet includes the plurality of openings that communicate noise energy to the noise attenuation layer. The face sheet protects the noise attenuation layer from objects or other debris that may impact against the liner assembly.

The face sheet is typically a single sheet that is attached over the noise attenuation layer such that an axial seam is formed. An acoustically active splice covers this axial seam to prevent intrusion of objects that may damage the noise attenuation layer. The splice includes a plurality of acoustic regions that are open to the face sheet and the plurality of openings to provide communication of noise energy through the acoustically active splice.

Accordingly, the liner assembly of this invention includes an acoustically active splice for covering a seam within the face sheet that provides for improved acoustical performance of the liner assembly.

These and other features of the present invention can be best understood from the following specification and drawings, the following of which is a brief description.

DETAILED DESCRIPTION OF THE PREFERRED EMBODIMENT

Figure 1:
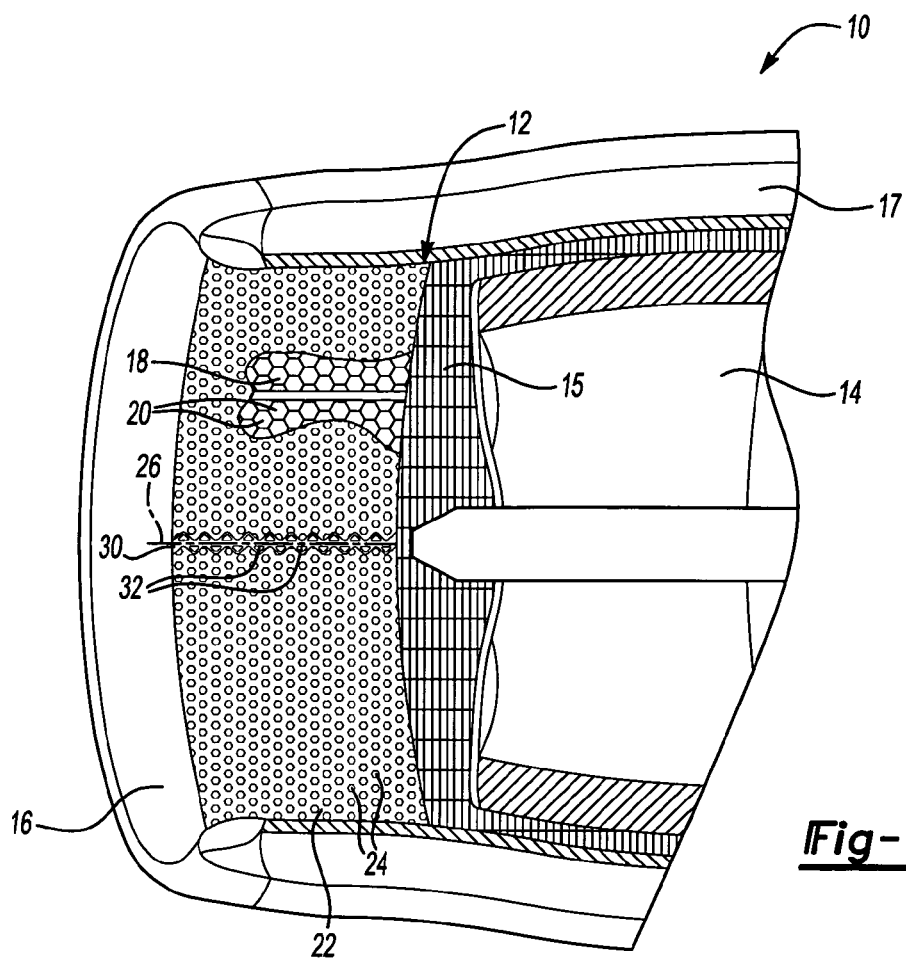
FIG. 1 is a partial sectional view of a fan case assembly according to this invention.
Figure 2:
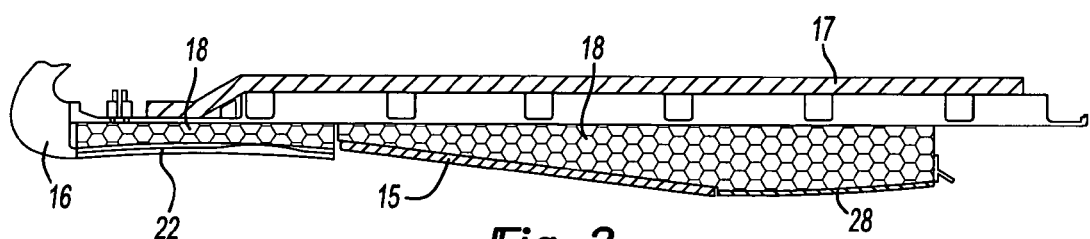
FIG. 2 is a cross-sectional view of the fan case assembly according to this invention.

Referring to FIGS. 1 and 2, a duct for a engine assembly is shown and commonly referred to as a fan case assembly 10. The fan case assembly 10 includes an exterior housing 17 and a liner assembly 12 that defines an interior surface of the fan case assembly 10. The liner assembly 12 includes a noise attenuation layer 18 having a plurality of cells 20. Noise energy passes through a face sheet 22 into the plurality of cells 20 where it is dissipated as heat.

The face sheet 22 includes a plurality of openings 24 that provide for communication of noise energy emitted by the gas turbine engine to the noise attenuation layer 18. The face sheet 22 is a sheet of metal or composite material that is wrapped circumferentially within the fan case assembly 10. The face sheet 22 may comprise a single sheet of material or several sheets. Whether one or many face sheets 22 are utilized, a seam 26 is formed along adjacent edges of the face sheet 22. The seam 26 is formed as a result of assembly stack up tolerances, and to accommodate thermal expansion during operation. An acoustically active splice 30 according to this invention is installed to cover the seam 26 and prevent intrusion of objects and other material to the noise attenuation layer 18.

The noise attenuation layer 18 extends in sections from a cowling 16 of the fan case assembly 10 rearward under the face sheet 22. The noise attenuation layer 18 continues further rearward under an abradiable strip 15 that is disposed adjacent a fan blade 14. The abradiable strip 15 absorbs and protects the fan blades 14 from contact with the liner assembly 12. Another portion of the noise attenuation layer 18 extends further rearward from the abradiable strip under a plate 28. The plate 28 is of material that is thicker than the face sheet 22 and provides impact protection for the liner assembly 12.

An acoustically active splice 30 covers the seam 26 in the face sheet 22. The splice 30 covers the seam 26 and includes a plurality acoustic regions 32. The acoustic regions 32 provide for the communication of noise energy through the splice 30 to the plurality of openings 24 within the face sheet 22. The communication of noise energy through the splice 30 provides an acoustically active seam that absorbs noise energy rather than reflecting it or blocking noise energy from entering the plurality of openings 24 within the face sheet 22 that would create an acoustically dead zone.

Figure 3:
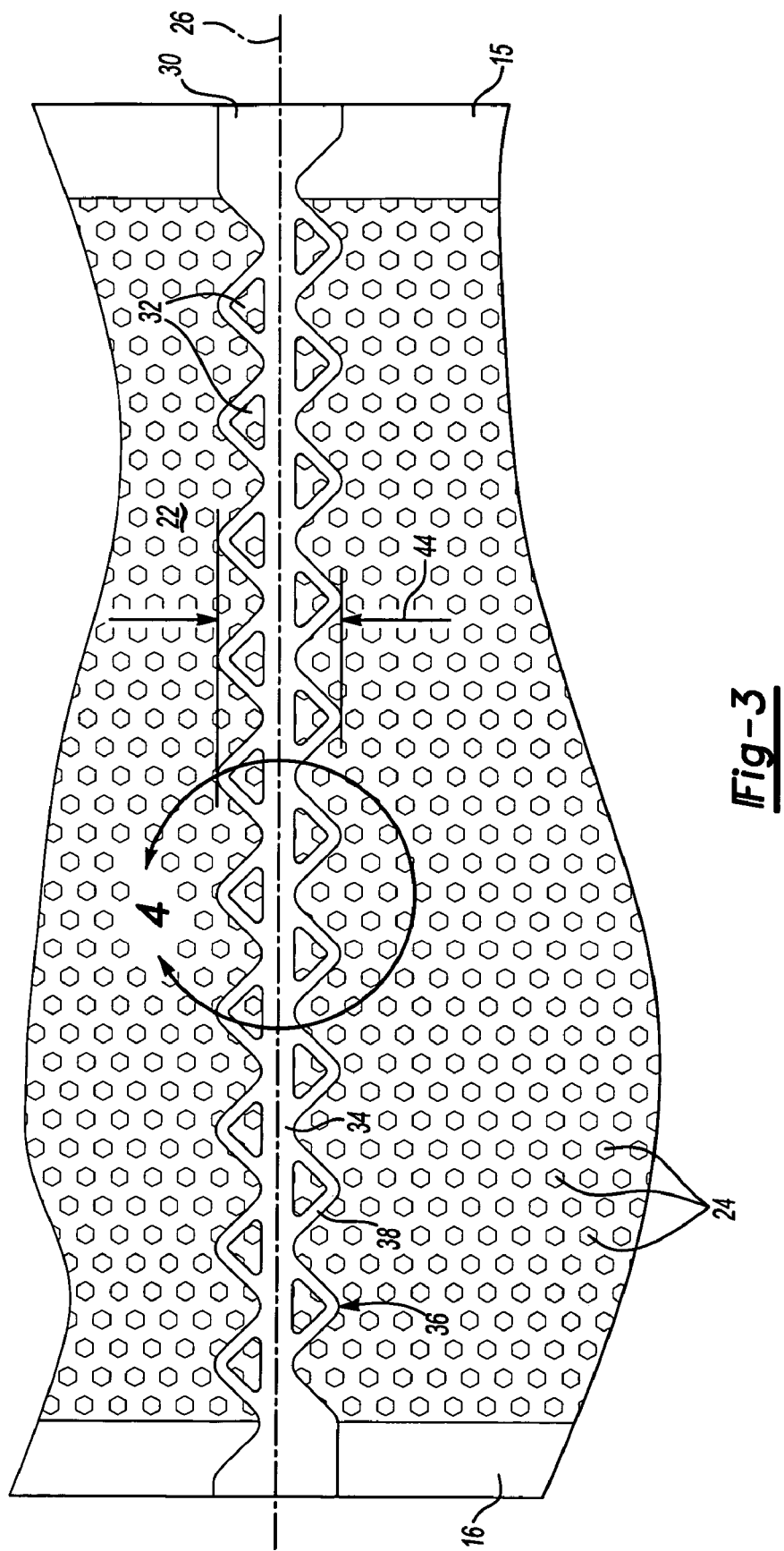
FIG. 3 is a plane view of the acoustically active splice according to this invention.

Referring to FIG. 3, the splice 30 includes a center portion 34 that covers the seam 26. Extending outwardly from the center portion 34 is a web structure 36. The web structure 36 includes a plurality of web portions 38 that define the boundaries of the acoustic regions 32. The acoustic region 32 extends from the center portion 34 to define an overall width of the splice 30. The overall width 44 provides a bonding area that is adhered adjacent edges of the face sheet 22 along the seam 26.

Figure 4:
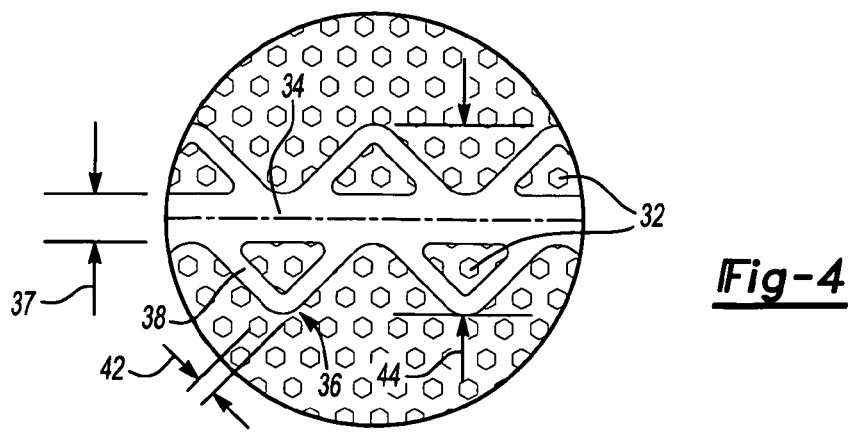
FIG. 4 is an enlarged view of a portion of the acoustically active splice according to this invention.
Figure 5:
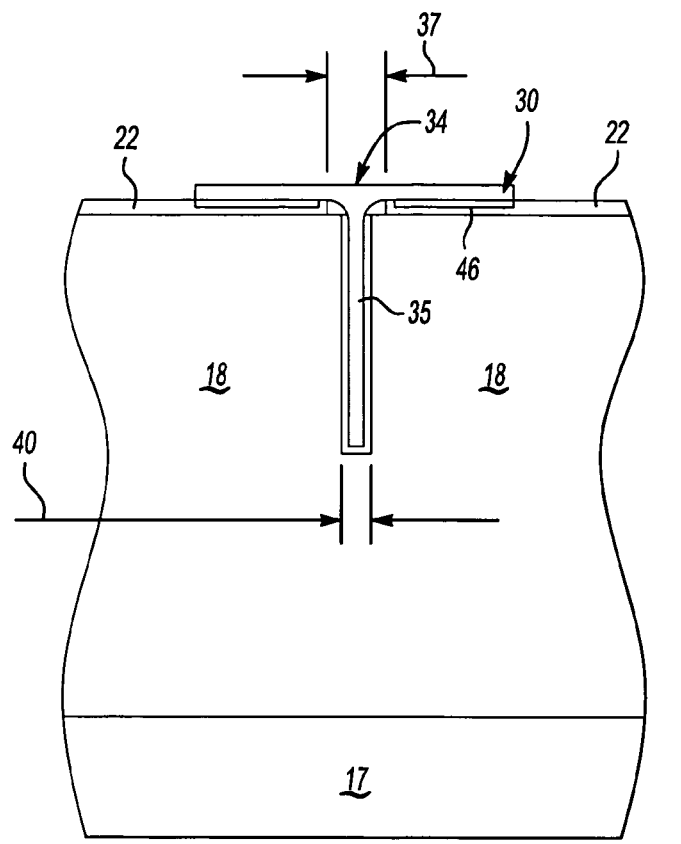
FIG. 5 is a cross-sectional view of the example acoustically active splice.

Referring to FIGS. 4 and 5, the splice 30 provides the open areas in the form of the acoustic regions 32 providing for noise energy to pass through. However, the splice 30 must also include sufficient area on either side of the seam 26 to provide for bonding material to adhere and affix the splice 30 to the face sheet 22. The web portions 38 include a width 42 that minimizes local blockage of the plurality of openings 24, and also combines to provide desired bonding area for securing the splice 30 to the face sheet 22.

Further, the center portion 34 includes a width 37 that is preferably of such a size as to ensure coverage of the seam 26 between ends of the face sheet 22. The center portion 34 is not completely bonded to the face sheet 22 as a portion of the center portion 34 covers a gap 40 formed by the seam 26. The width 37 of the center portion 34 is determined to cover the seam 26 for the extremes of tolerance stack up conditions for a specific application.

The splice 30 includes a tail portion 35 that extends downwardly between and into the seam 26 and adjacent portions of the noise attenuation layer 18. Adhesive 46 is utilized on opposite sides of the seam 26 to adhere the splice 30 over the seam 26.

The acoustic regions 32 are configured as a plurality of repeating triangle shaped openings defined by the web structure 36. The web structure 36 provides the triangle shaped openings as a series of alternating chevrons disposed on either side of the center portion 34. The alternating shapes provide the desired openness to the underlying face sheet 22 while combining to provide desired surface area sufficient for providing a desired bond between with the face sheet 22. Although the acoustic splice 30 as illustrated in the example embodiment as triangular shaped acoustic regions 32 it is within the contemplation of this invention that other shapes of acoustic regions may also be utilized.

Figure 6:
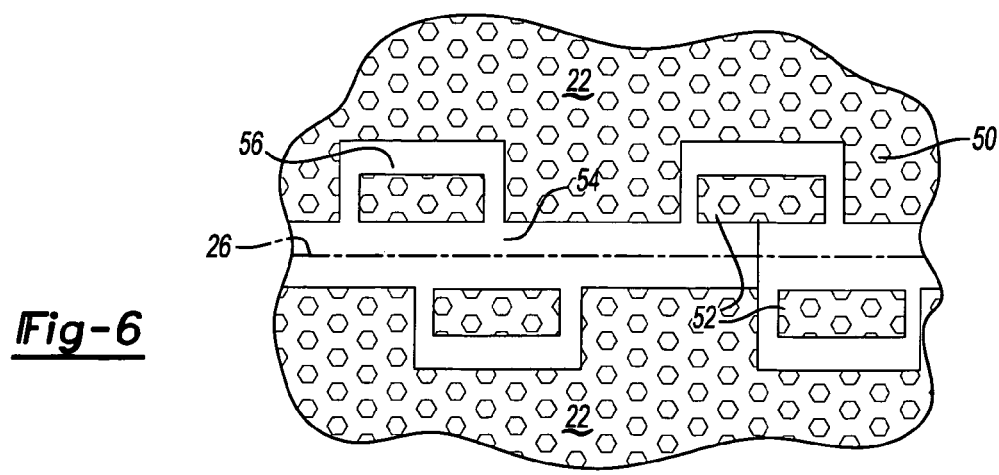
FIG. 6 is an enlarged view of a portion of another example acoustically active splice according to this invention.

Referring to FIG. 6 another example splice 50 according to this invention includes a series of rectangular shaped acoustic regions 52. The acoustic regions 52 are defined by a web structure 56 that extends from a center portion 54. The openness of the acoustic regions 52 provide communication to the underlying noise attenuation layer to provide an acoustically active region that absorbs noise energy to minimize sound emitted from the fan case assembly 10.

Accordingly, the acoustic splice of this invention provides a liner assembly that has substantially improved noise attenuation characteristics due to the substantial elimination of an acoustically dead seam between edges of the face sheet.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A liner assembly for a duct comprising:
   a noise attenuation layer;
   a face sheet over said noise attenuation layer, said face sheet including a plurality of openings and a seam; and
   a splice for covering said seam, wherein said splice includes an acoustic region open to said plurality of openings within said face sheet, wherein said acoustic region comprises an open area defined by surrounding portions of said splice.

2. The assembly as recited in claim 1, wherein said splice includes a center portion covering said seam and said acoustic region comprises a plurality of acoustic regions disposed on either side of said center portion.

3. The assembly as recited in claim 2, wherein said surrounding portions comprise a web structure extending outwardly from said center portion.

4. The assembly as recited in claim 3, wherein said web structure comprises a plurality of web portions having a width less than a spacing between said plurality of openings within said face sheet.

5. The assembly as recited in claim 1, wherein said acoustic regions are substantially triangular in shape.

6. The assembly as recited in claim 1, wherein said acoustic regions are substantially rectangular in shape.

7. The assembly as recited in claim 1, wherein said noise attenuation layer comprises a plurality of individual chambers, each of said individual chambers in communication with at least one of said plurality of openings within said face sheet.

8. The assembly as recited in claim 1, including an adhesive for bonding said splice to said face sheet.

9. The assembly as recited in claim 8, wherein said adhesive is applied to a portion of said splice surrounding said acoustic region.

10. A splice for covering seams of a duct liner assembly, said splice comprising:
    an acoustic region comprising an open area defined by surrounding portions of said splice, wherein said open area is open to a plurality of openings within a face sheet of the duct liner assembly.

11. The assembly as recited in claim 10, wherein said splice includes a center portion covering the seam and said acoustic region comprises a plurality of acoustic regions disposed on either side of said center portion.

12. The assembly as recited in claim 10, wherein said acoustic regions are substantially triangular in shape.

13. The assembly as recited in claim 10 wherein said acoustic regions are substantially rectangular in shape.

14. The assembly as recited in claim 10, wherein said acoustic regions comprise a repeating geometric pattern mirrored and offset on each side of said center portion.

15. A fan case assembly comprising:
    a fan case body;
    an abradable strip for absorbing impact with a fan blade;
    a noise attenuation layer;
    a face sheet disposed forward of said abradable strip and including a plurality of openings for communicating sound energy to said noise attenuation layer, said face sheet including a seam; and
    an acoustic splice for covering said seam, said acoustic splice including acoustic regions providing for communication of sound energy through said acoustic splice to said noise attenuation layer, wherein said acoustic regions comprise an open area surrounded by portions of said acoustic splice.

16. The assembly as recited in claim 15, wherein said acoustic splice comprises a center portion covering saidseam and said acoustic regions are disposed on either side of said acoustic regions.

17. The assembly as recited in claim 15, wherein said acoustic regions comprise a repeating geometric pattern mirrored and offset on each side of said center portion.

18. The assembly as recited in claim 15, wherein said acoustic regions comprise a plurality of triangular shaped openings disposed on each side of said center portion.

* * * * *

UNITED STATES PATENT AND TRADEMARK OFFICE
CERTIFICATE OF CORRECTION

| | |
|---|---|
| PATENT NO. | : 7,296,655 B2 |
| APPLICATION NO. | : 11/112642 |
| DATED | : November 20, 2007 |
| INVENTOR(S) | : Costa et al. |

Page 1 of 1

It is certified that error appears in the above-identified patent and that said Letters Patent is hereby corrected as shown below:

Claim 16, Column 4, line 56: "saidseam" should read as --said seam--

Signed and Sealed this

Fifteenth Day of April, 2008

JON W. DUDAS
*Director of the United States Patent and Trademark Office*